J. T. ELLIOTT.
Horse Hay-Fork.
No. 85,437.
Patented Dec. 29, 1868.
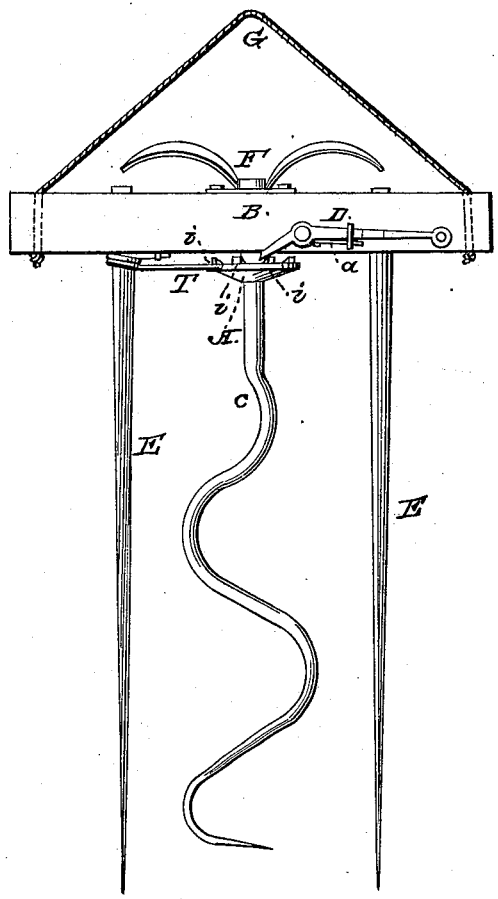
witnesses
Inventor

JOHN T. ELLIOTT, OF GRAND RAPIDS, MICHIGAN.

Letters Patent No. 85,437, dated December 29, 1868.

IMPROVEMENT IN HORSE HAY-FORKS.

The Schedule referred to in these Letters Patent and making part of the same.

*To all whom it may concern:*

Be it known that I, JOHN T. ELLIOTT, of Grand Rapids, in the county of Kent, and in the State of Michigan, have invented certain new and useful Improvements in Hay-Forks; and do hereby declare that the following is a full, clear, and exact description thereof, reference being had to the accompanying drawings, and to the letters of reference marked thereon.

The nature of my invention consists in a device to start the spiral tine of a hay-fork to revolve.

It is well known that, when hay is raised by such a fork, it is often necessary to start the spiral tine, so that it revolves backwards, as the inclined plane under the hay is not sufficient to do so. This is more especially the case with clover-hay, or when the hay is damp, or when the fork may be rusty.

By my device, the spiral tine is easily started, and, when once started, the hay itself will finish it.

In order to enable others skilled in the art to make and use my invention, I will now proceed to describe its construction and operation.

In the annexed drawings, forming part of this specification—

B represents a wooden bar, forming the head of a hay-fork, and to which the side tines E E are securely fastened.

Between these tines the spiral tine C is attached, and said tine is provided, at the top of the bar B, with a handle, F, for turning the same.

On the spiral tine C, just below the bar B, is a wheel, A, which is firmly fastened to said tine, and provided with lugs *i i* on its upper side.

On the side of said bar is a lever, D, fastened, which lever is so arranged with a spring, *a*, that the end thereof catches on the lugs *i i*, and prevents the spiral tine from being turned backward, unless the lever be raised.

A spring, T, is also arranged, at suitable distance from the spiral tine, and in any manner desirable, so that the end thereof may be inserted between the lugs on said wheel, and the tine by that means forced to turn backwards.

The operation is as follows:

Insert the end of the spring T between two of the lugs on the wheel A, and turn the spiral tine C, by means of its handle F, forward far enough to give said spring a sufficient bend, the lever D preventing the tine from turning backwards.

When it is then desired to unload the hay, raise the lever D, by means of a rope, attached to its outer end, and the spring T will force the spiral tine C to turn backwards, and, after the same is once started, the hay itself will carry this motion on until all the hay is off from the fork.

The wheel A may have the lugs on its lower side, as well as on the upper, or they may be placed on its periphery, only changing the lever D and spring T, so as to operate in the same manner as already described.

The whole device, wheel A, lever D, and spring T, may be placed on the upper side of the bar B, as well as on the lower.

The bar B has a hole through each end, through which hole a rope, G, is passed, said rope being fastened on the under side of the wooden bar or head.

To this rope the long rope for raising is hitched, in any manner desired.

Having thus fully described my invention,

What I claim as new, and desire to secure by Letters Patent, is—

The construction and arrangement of the wheel or disk A and its pins *i i*, upon the upper portion of the spiral C, in combination with the spring T and lever D upon the head, having tines E E, all as herein set forth.

In testimony that I claim the foregoing, I have hereunto set my hand and seal, this 1st day of June, 1868.

JOHN T. ELLIOTT. [L. S.]

Witnesses:
 SHELDON LEAVITT,
 JOSEPH B. ESCOTT.